United States Patent
Johnson et al.

(10) Patent No.: US 6,489,974 B1
(45) Date of Patent: Dec. 3, 2002

(54) BUOY ICON NOTIFICATION OF OBJECT INTERFACE ACCESSIBILITY IN MULTITASKING COMPUTER ENVIRONMENT

(75) Inventors: William J. Johnson, Flower Mound; Larry M. Lachman; Michael D. Smith, both of Irving, all of TX (US)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 08/586,149

(22) Filed: Jan. 11, 1996

Related U.S. Application Data

(63) Continuation of application No. 08/179,479, filed on Jan. 10, 1994, now abandoned.

(51) Int. Cl.[7] ............................................. G06F 15/62
(52) U.S. Cl. ...................... 345/772; 345/839; 345/771; 709/100
(58) Field of Search ................................ 395/650, 800, 395/159; 364/521, 724, 721, 200

(56) References Cited

U.S. PATENT DOCUMENTS

| | | | | |
|---|---|---|---|---|
| 4,783,648 A | * | 11/1988 | Homma et al. | 340/724 |
| 4,975,690 A | * | 12/1990 | Torres | 340/721 |
| 5,050,105 A | * | 9/1991 | Peters | 364/521 |
| 5,113,517 A | * | 5/1992 | Beard et al. | 364/200 |
| 5,301,348 A | * | 4/1994 | Joaskelainen | 395/800 |
| 5,333,256 A | * | 7/1994 | Green et al. | 395/159 |

OTHER PUBLICATIONS

Presentation of Prompt Information, Sep. 1990, IBM Research Disclosure n317 09–90.

Open Look Graphical User Interface Functional Specification, Sun Microsystems, Inc., 1989, Addison–Welsey Publishing Company, Inc., pgs. cover, inside, 91–94.

Common Access Advanced Interface Design Guide, Systems Application Architecture, IBM, Jun. 1989, pgs. cover, inside, 83–87.

OSF/MOTIF Style Guide, Open Software Foundation, Prentice Hall, 1991, pgs. cover, inside, 7–22—7–25, 7–31, 7–54, 7–71, 7–88—7–89, 7–92—7–93, 7–129, 7–133.

* cited by examiner

*Primary Examiner*—Majid Banankhah
(74) *Attorney, Agent, or Firm*—Geoffrey A. Mantooth

(57) ABSTRACT

Notification of an executing object becoming idle is provided in a multitasking environment. As the object executes, a user can interface with a second object. When the executing object becomes accessible, a buoy icon object is displayed on the computer screen. The buoy icon has the name of the accessible object as well as a pointer line extending from the buoy icon to the accessible object. The buoy icon provides notification that the accessible object execution is complete or is ready to receive a user input. The user can either remove the buoy icon from the screen or select the buoy icon object to focused the accessible object. The newly focused accessible object can then be used. The buoy icon notification can be enabled or disabled on an object-by-object basis.

25 Claims, 11 Drawing Sheets

BUOY ICON NOTIFICATION OF OBJECT INTERFACE ACCESSIBILITY IN MULTITASKING COMPUTER ENVIRONMENT

This application is a continuation of Ser. No. 08/179,479 filed Jan. 10, 1994, now abandoned.

TECHNICAL FIELD OF THE INVENTION

The present invention relates to methods and apparatuses for notification of user input situations and execution terminations in asynchronously executing tasks in multitasking computer environments.

BACKGROUND OF THE INVENTION

Multitasking computer environments allow users to run or execute plural objects (such as application programs) in an apparent simultaneous manner. For example, a user can execute a spread sheet application, a graphics application and a phone application at the same time.

Each object has a user interface displayed to a user on a computer screen. User interfaces for specific applications on a computer system present themselves on a computer screen as a window, a full screen session, an icon or plural combinations thereof. When a full screen session object is selected, the user interface takes up the entire screen and may prompt the user with a command line. When an object is displayed as a window, the window typically takes up only a portion of the screen, so that other objects may be seen.

A user input is provided to an object through a focused window or full screen session only one object can be focused (or otherwise made accessible to a user) at any one time. If an object is not focused, it is not enabled for receiving a user input. Unfocused objects may or may not be obscured from the view of the user by the focused object. For example, if the focused object is represented by a full screen session, then all unfocused objects are obscured from view. If the focused object is represented by a window that takes up only a portion of the screen, then some objects (represented as either windows or icons) are likely to be visible.

The limitation that only one object can be focused for receiving a user input at any given time presents a problem in multitasking computer environments. A user may start an application in one user interface and then go to another user interface to work with another application. The user must poll the first application to determine when the first application either completes or prompts for a user input. Alternatively, the user can simply sit at the screen, waiting for the first application to complete and prompt for a user input. For example, suppose a user begins the formatting of a diskette. To continue operations with the diskette, the user must wait for the formatting to be completed. While formatting, the user begins to use other applications. While using these other applications, a convenient method is needed to indicate the completion of the formatting of the diskette.

In general, a convenient method is needed to indicate to the user that either a specific asynchronously executing task is complete or that a prompt for user input has been provided.

SUMMARY OF THE INVENTION

It is therefore an object of the present invention to provide a method and apparatus for providing notification to a user of an object prompt mode, regardless of the activity that the user is engaging in.

It is another object of the present invention to provide a method and apparatus for providing notification to a user of termination of an asynchronously executing task.

The present invention provides a method and apparatus for providing notification of availability of an object on a multitasking computer. A first object is executed. While the first object is executing, a second object is enabled for receiving a user input on a user interface of the computer. It is then determined when the first object becomes accessible. Becoming accessible implies either the availability for entering input to a task or session or the termination of an asynchronously executing task. When the first object becomes accessible, a notification is provided on the user interface.

The present invention provides automatic notification to a user of when an object becomes accessible. Thus, a user can execute a first object on a computer. The user need not wait for the object to finish executing. Instead, the user can turn to other tasks, such as interfacing with the second object. While interfacing with the second object, the user need not return to the first object to check on the progress of its execution. With the present invention, a buoy icon object is automatically displayed on the screen when the first object becomes accessible or otherwise ceases execution.

In accordance with one aspect of the present invention, the determination of when the first object becomes accessible further includes the determination of when the first object provides a prompt for a user input.

In another aspect of the present invention, the determination of when the first object becomes accessible further includes the determination of when an asynchronously executing task terminates.

In accordance with still another aspect of the present invention, the provision of a notification on the user interface when the first object becomes accessible further includes displaying a buoy icon on a screen. In addition to the buoy icon, a name of the first object can be displayed in proximity to the buoy icon. Also, a line or other visual indicator between the buoy icon and the first object can be displayed on the screen.

In accordance with another aspect of the present invention, the computer contains plural objects which include first and second objects. The present invention allows enabling the notification for selected ones of the objects. In still another aspect of the present invention, the notification can be disabled for selected ones of said objects.

In still another aspect of the present invention, the notification can be removed from the user interface after the notification has been displayed.

In still another aspect of the present invention, after the notification has been displayed, the notification is selected. Then, the associated object is focused on the user interface, wherein user input can be provided to the newly focused object.

In still another aspect of the present invention, the computer includes a third object, and the notification is a first notification. The third object is executed. A determination is made when the third object becomes accessible. A second notification is displayed on the user interface when the third object becomes accessible. The second notification is removed from the user interface while maintaining the first notification on the user interface. Alternatively, instead of removing the second notification from the user interface, the second notification can be selected, wherein the third object is focused on a user interface while maintaining the first notification on the user interface.

BRIEF DESCRIPTION OF THE DRAWINGS

FIG. 6 shows the method for enabling buoy icon notification for an object. FIG. 7 shows the method for registering and tracking active objects. FIG. 8 is the method for displaying a buoy icon for an accessibled object. FIG. 9 is the method for removing a buoy icon from the screen. FIG. 10 is the method for selecting a buoy icon and providing focus to its associated object. FIG. 11 is the method for disabling buoy icon notification for an object.

FIG. 12 is a table of those objects currently being executed. FIG. 13 is a table of those objects for which a buoy icon notification has been enabled. FIG. 14 is a table of those objects for which a buoy icon has been displayed.

DESCRIPTION OF THE INVENTION

Figure 1:
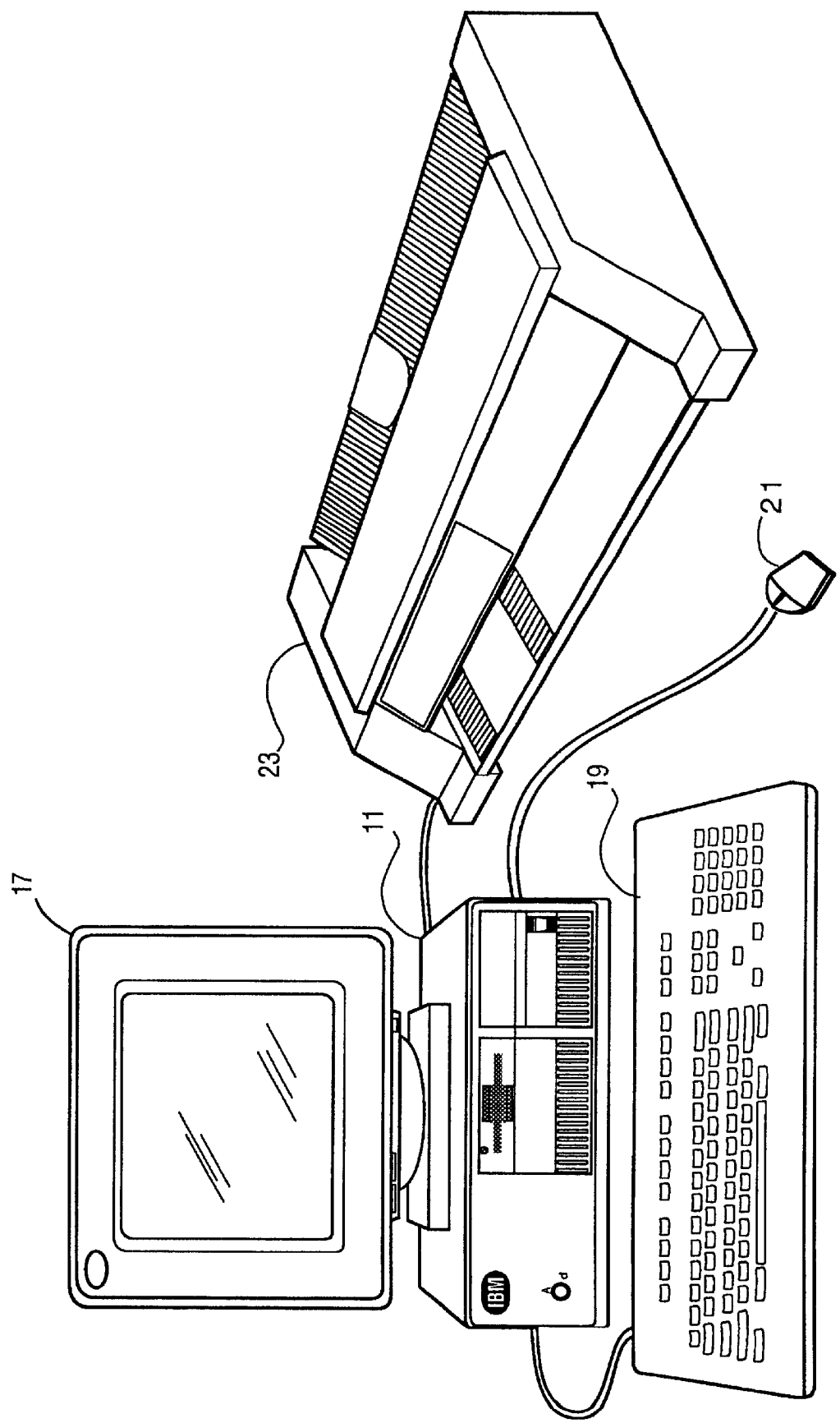
FIG. 1 is a schematic diagram of a data processing system on which the present invention can be practiced.

In FIG. 1, there is shown a schematic diagram of a data processing system 11 or computer, upon which the present invention can be practiced. The computer 11 includes a user interface, which has a display screen 17 and a keyboard 19. Other input devices may also be provided, such as a mouse 21, a touch screen and a microphone for voice input. Each computer 11 may also be coupled to a printer 23 or other output device. The computer 11 typically includes a hard disk drive and floppy disk drive storage devices.

The computer 11 also has internal memory in the form of Random Access Memory (RAM). The RAM memory stores resource objects for execution and access by a Central Processing Unit (CPU) located within the computer. One such resource object is the method of the present invention shown by the flow charts. Another such resource object is an operating system. The computer 11 utilizes an operating system that provides multitasking capabilities. One such operating system is OS/2, which is available from IBM. (Both OS/2 and IBM are trademarks of International Business Machines Corporation.)

Figure 2:
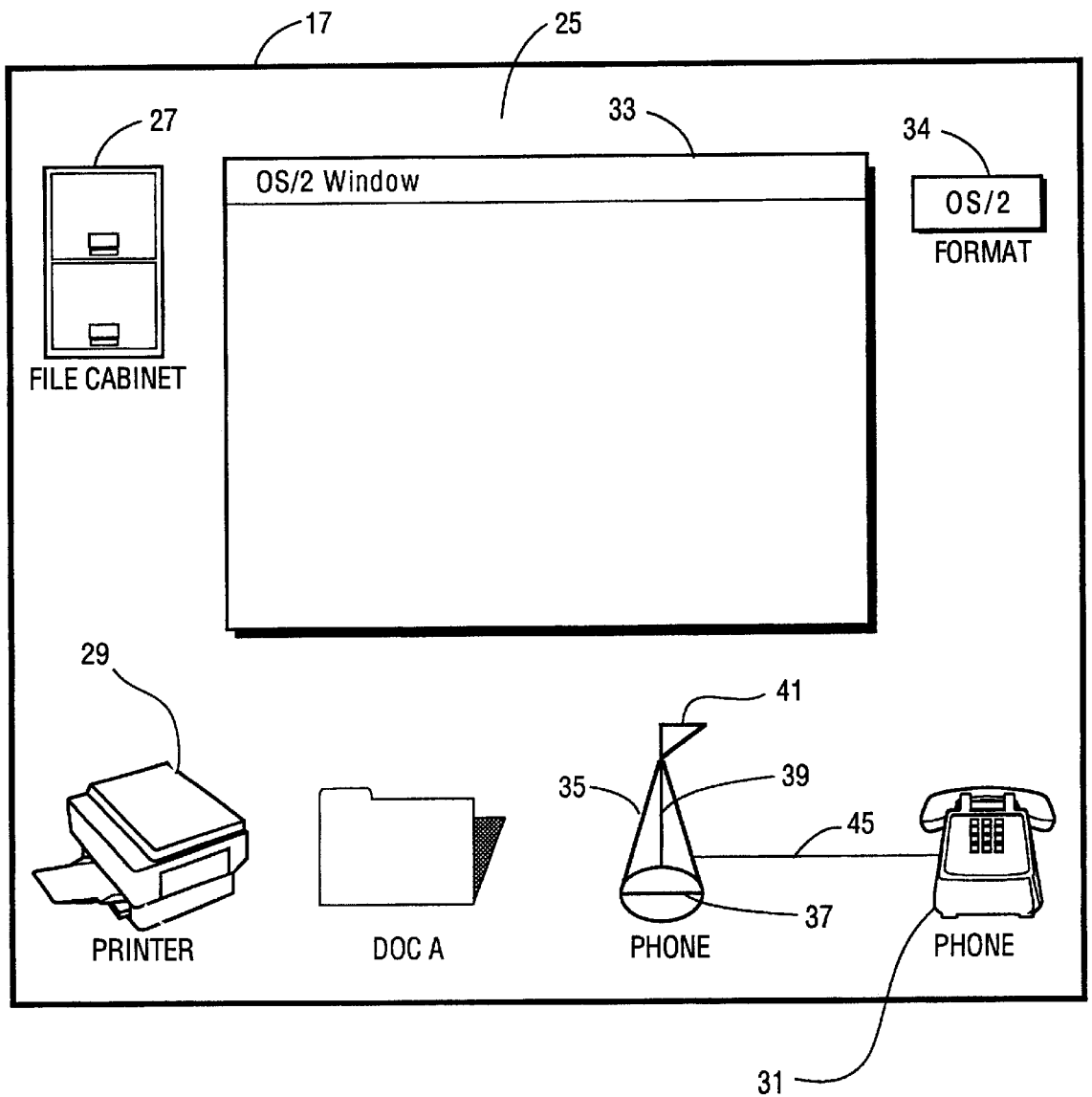
FIG. 2 is a schematic view of a screen showing a desktop with a buoy icon of the present invention, in accordance with a preferred embodiment, displayed thereon.
Figure 4:
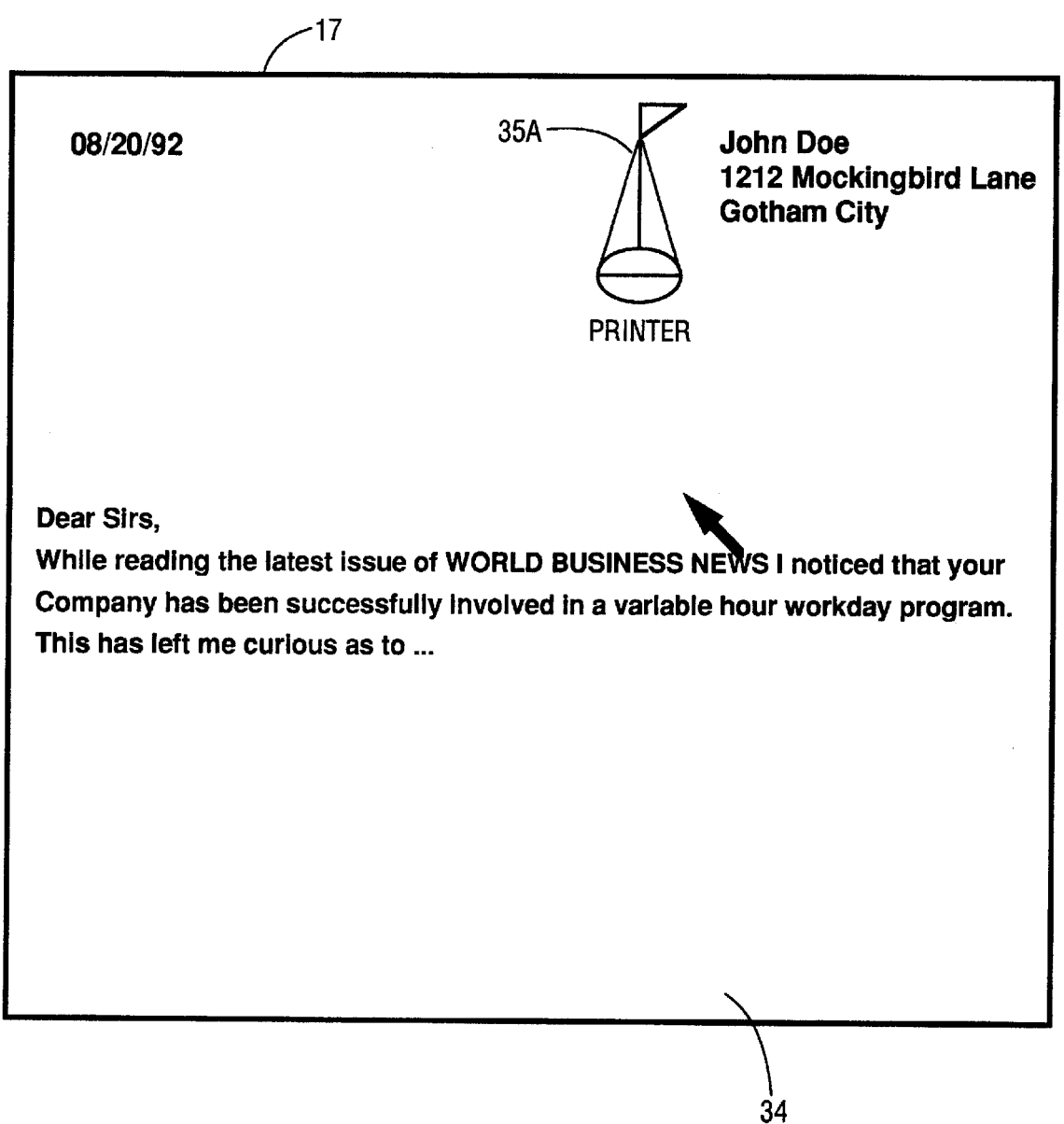
FIG. 4 is a schematic view of a screen showing a full screen session with a buoy icon displayed thereon.

In FIG. 2, there is shown a desktop display 25 on the screen 17. The desktop 25 contains plural icons representing plural objects. For example, there is a file cabinet icon 27, a printer icon 29, a phone icon 31, etc. None of the objects represented by icons can receive a user input, as they are not focused (or enabled to receive a user input). A focused object presents either a window 33 displayed in the foreground of the desktop (as shown in FIG. 2) or a full screen session 34 displayed in full on the screen (as shown in FIG. 4). In FIG. 2, the focused object 33 is named "OS/2 window" and is enabled to receive user inputs. Thus, the user can type in data, use a mouse cursor or use some other input device to input data or other information to the "OS/2 window" object 33.

To illustrate the buoy icon notification of the present invention, suppose that the user has enabled the present invention to provide notification of when the phone object 31 is available for user input. For example, suppose that the user had earlier been interacting with the phone object 31 before interacting with the "OS/2 window" object 33. While interacting with the phone object 31 (through a focused window), the user reached a step where the phone object executed a task such as sending a fax transmission, causing the user to wait. Instead of remaining with the phone object while waiting, the user enabled the present invention and focused the "OS/2 window" object 33. Thus, the user is able to accomplish some work with the object 33 while waiting for the phone object 31 to execute.

When the execution of the phone object 31 reaches a step where a user input is required for further execution, then the present invention causes a buoy icon 35 to be displayed on the desktop 25. Those skilled in the art recognize various algorithms may be used to determine a best placement of the buoy icon without departing from the spirit and scope of the present invention. The preferred embodiment of the buoy icon is analogous to a maritime buoy used as an aid to ship navigation. Just as a maritime buoy provides information that is useful for maritime navigation, the buoy icon 35 of the present invention provides information that is useful for navigation among computer user interfaces. Those skilled in the art recognize that alternative buoy representations can be utilized without departing from the spirit and scope of the present invention. The buoy icon 35 indicates when a specified object is available for user input. Thus, the user need not wait for an object to execute or switch back and forth between focused objects checking on the status of the object in interest.

The preferred buoy icon 35 has a float 37, a mast 39 and a flag 41 so as to resemble a maritime buoy. The buoy icon 35 specifies the associated object by either appearing with the object's name (such as "PHONE"), or appearing with a line (or other visual indicator) 45 connecting the buoy icon 35 to the object 31 or both (as shown in FIG. 2).

The user's attention will generally be drawn to the buoy icon upon the sudden appearance of the icon 35 on the desktop 25. However, other means for attracting the attention of the user could be utilized. For example, the buoy icon can beep (using a speaker in the computer), pulse to alternate between larger and smaller sizes, change colors, etc.

Once the buoy icon appears, the user can pursue several alternatives. First, the user can ignore the buoy icon and continue utilizing the focused object 33. The appearance of the buoy icon does not change the input enabled status of the currently focused object.

Figure 3:
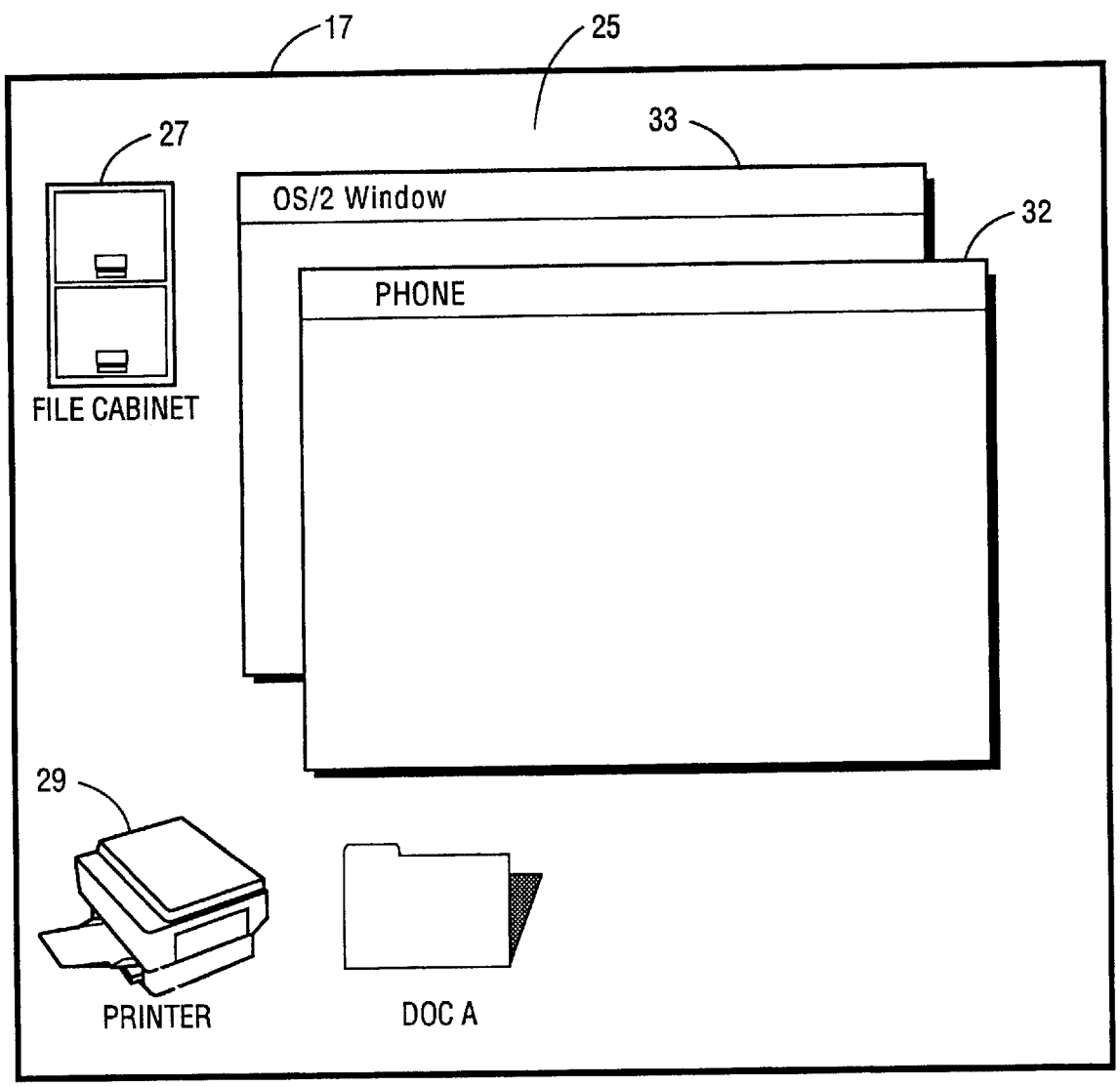
FIG. 3 is a schematic view of the screen and desktop of FIG. 2, shown after the buoy icon has been selected, wherein the object linked to the buoy icon has been focused.

Second, the user can select the buoy icon, wherein the specified object associated with the buoy icon is immediately focused. This is shown in FIG. 3, wherein the user has selected the buoy icon, and the window 32 for the phone object 31 has focused. Thus, the phone object is enabled to receive user input. The "OS/2 window" object 33 is relegated to the background and is no longer enabled to receive user input. The buoy icon has disappeared from the screen in FIG. 3.

The third option available to the user is that the user can dismiss the buoy icon, causing the icon to disappear, while maintaining the status quo among the objects. Thus, the currently focused object (for example the "OS/2 window" object 33) remains focused, and the phone object 31 remains as an icon in the background.

When a buoy icon is displayed, it generally appears outside of the focused object, unless there is insufficient space available. This is to minimize the possibility of creating a nuisance with the buoy icon popping up in the same area as the user is working. For example, in FIG. 4, a full screen session 34 is shown. The buoy icon 35A is displayed on the full screen session 34, as there is insufficient space for the buoy icon to be displayed off of the full screen session 34. In this situation, the buoy icon 35A is displayed near an edge of the screen 17 with prevention of overlaying displayed matter or with minimal prevention thereof.

Figure 5:
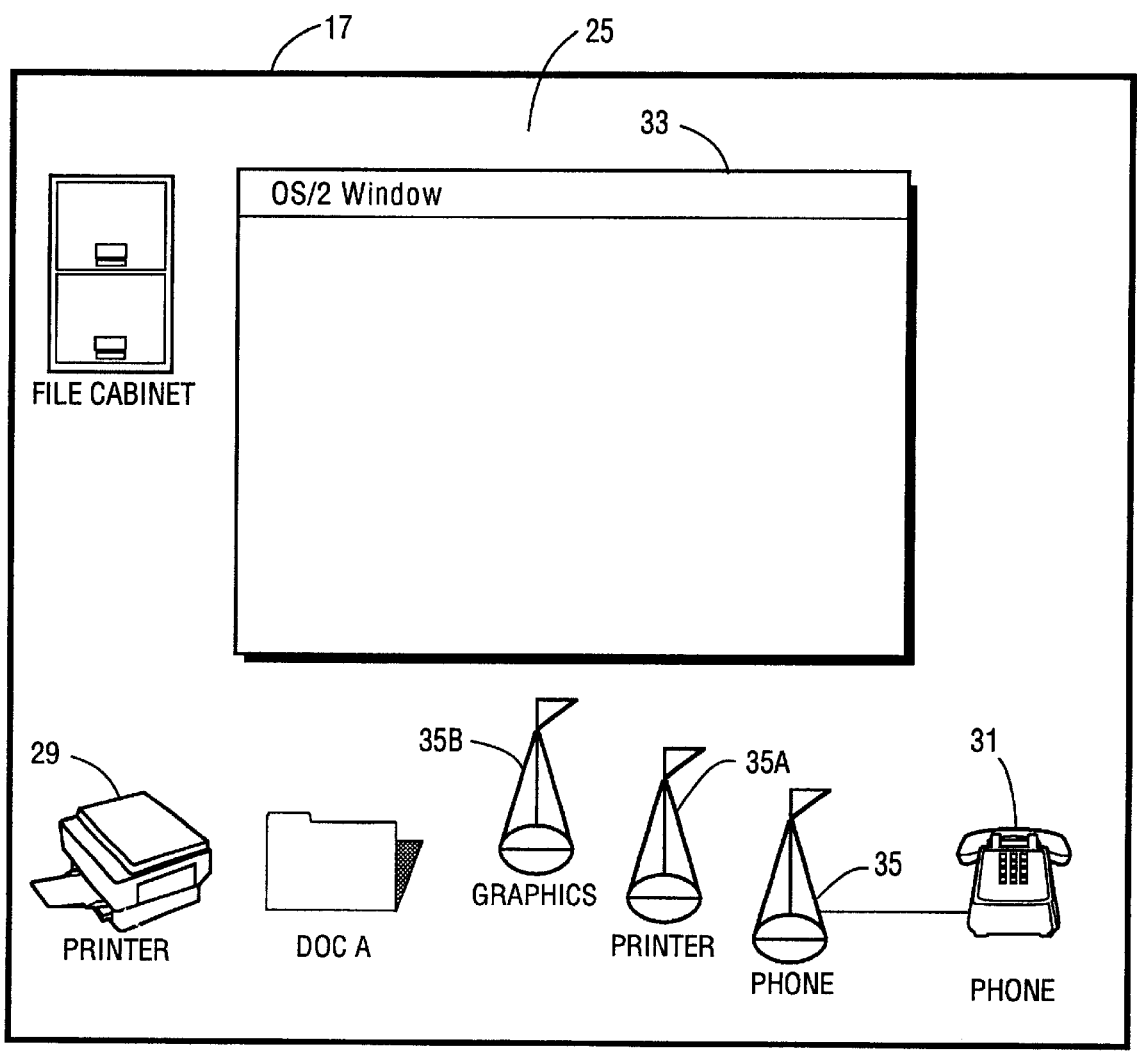
FIG. 5 is a schematic view of a screen showing a desktop with a plurality of buoy icons displayed thereon.

There may arise a situation where more than one object produces a buoy icon. In this situation, shown in FIG. 5, there are plural buoy icons 35, 35A, and 35B displayed. A buoy icon is displayed for each object that is ready for a user input. When one buoy icon is selected, the others remain displayed until selected or removed.

Referring now to FIGS. 6–11, the flow charts of the present invention will be described. In the flow charts, the following graphical conventions are observed: a rectangle is used to illustrate either a process, function or screen display, and a diamond is used to illustrate a decision. These conventions are well understood by programmers skilled in the art of user interfaces, and the flow charts are sufficient to enable a programmer skilled in the art to write code in any suitable computer programming language, such as PASCAL or C for a computer such as the IBM Personal System/2 (PS/2) family of computers which supports these languages. (Personal System/2 is a trademark of International Business Machines Corporation.)

Figure 6:
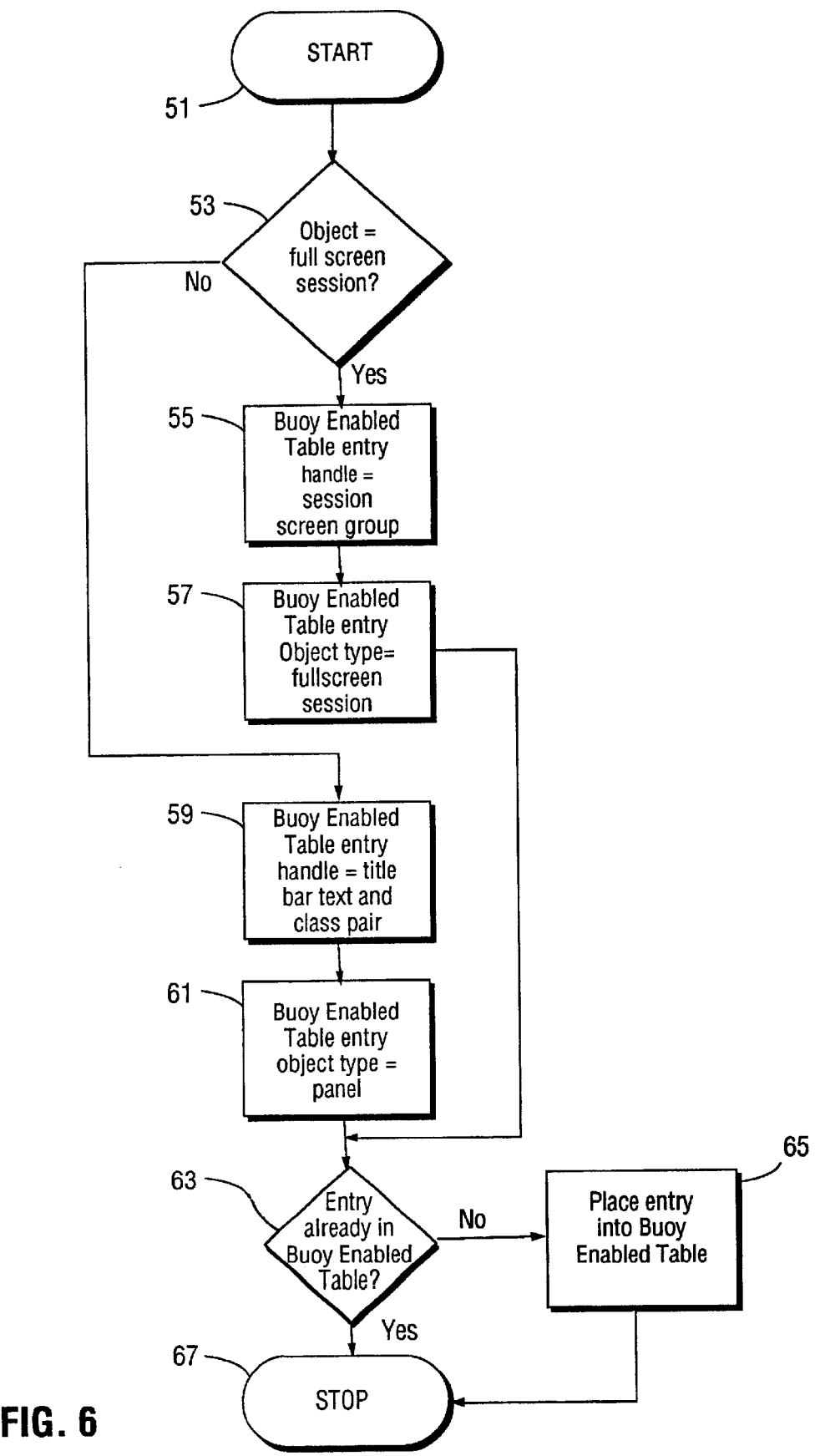
FIGS. 6–11 are flow charts showing various methods.
Figure 7:
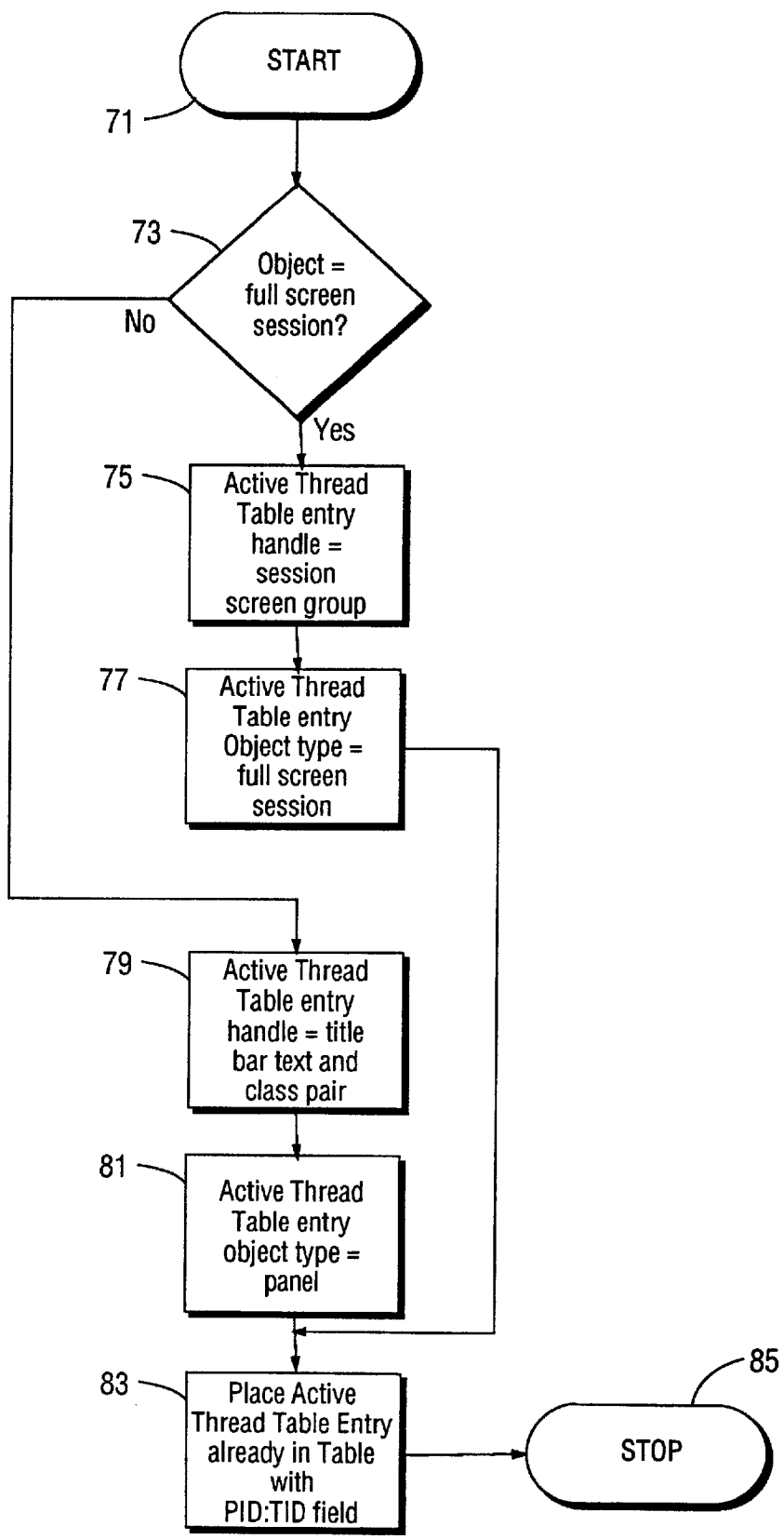
Figure 8:
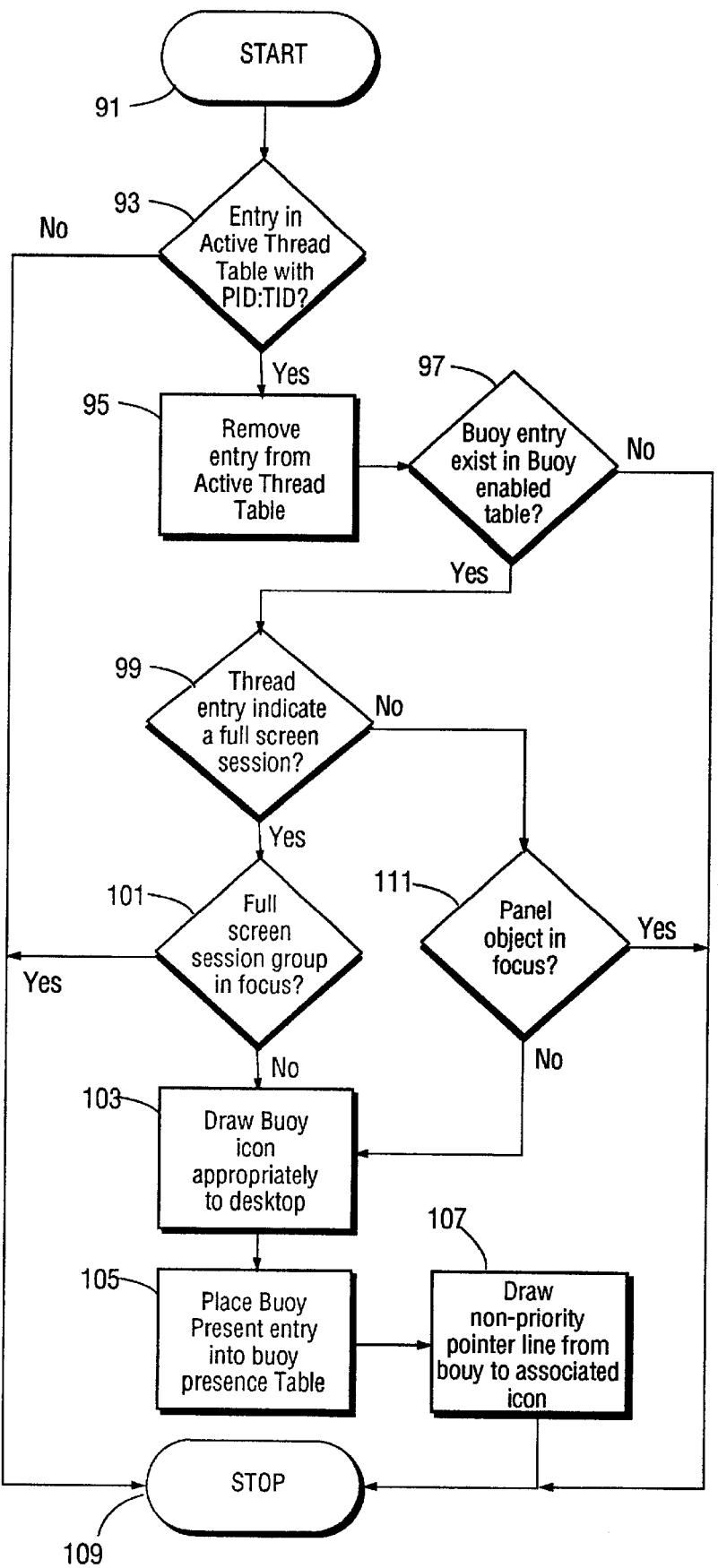
Figure 12:
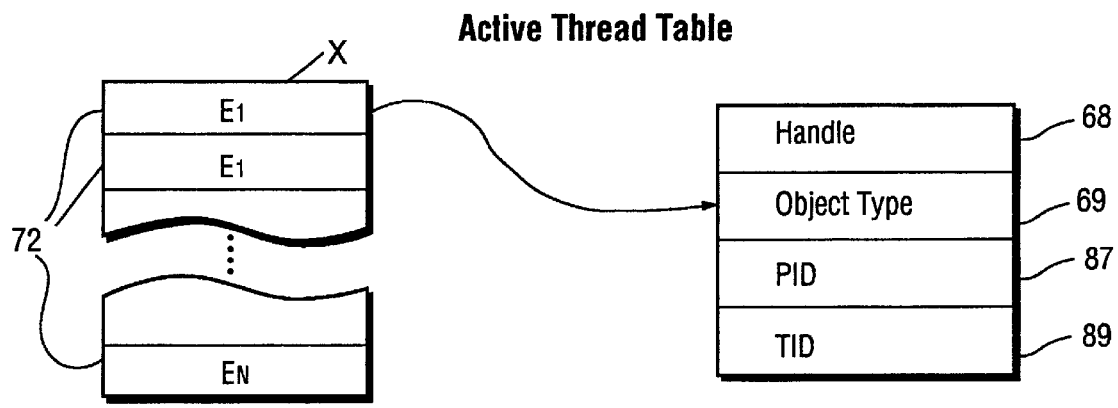
FIGS. 12–14 are schematic views of tables utilized by the present invention.

The flow charts will first be described generally, followed by a more specific discussion of the steps. In general, for a buoy icon to appear for an object, the object is enabled for buoy icon notification, and the status of the object changes from active to idle. A user enables the buoy icon notification of the present invention on an object-by-object basis. Examples of idled objects include an object that has completed a specific asynchronously executing task and an object that has provided a prompt for user input. The flow chart of FIG. 6 illustrates the enablement method. When an object is enabled for buoy icon notification, a handle 68 of the object is placed into a Buoy Enabled Table, shown in FIG. 13. When an object executes, the handle 68 of the object is placed into an Active Thread Table, shown in FIG. 12. The flow chart of FIG. 7 illustrates this. When the active object becomes idle, then the method illustrated by the flow chart of FIG. 8 is executed. The method of FIG. 8 determines if the idled object is in both the Buoy Enabled Table of FIG. 13 and the Active Thread Table of FIG. 12. If so, then a buoy icon for the idled object is displayed as shown in FIG. 2. The handle 68 for the object is placed into the Buoy Presence Table of FIG. 14.

Figure 9:
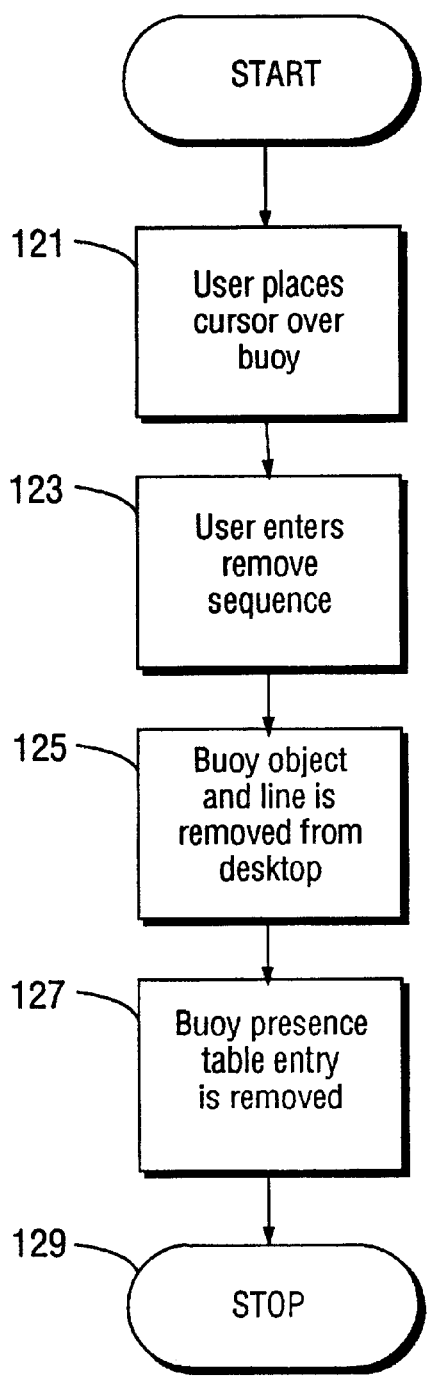

After the buoy icon has been displayed on the screen, the method illustrated by the flow chart of FIG. 9 allows a user to remove the buoy icon from the screen.

Figure 10:
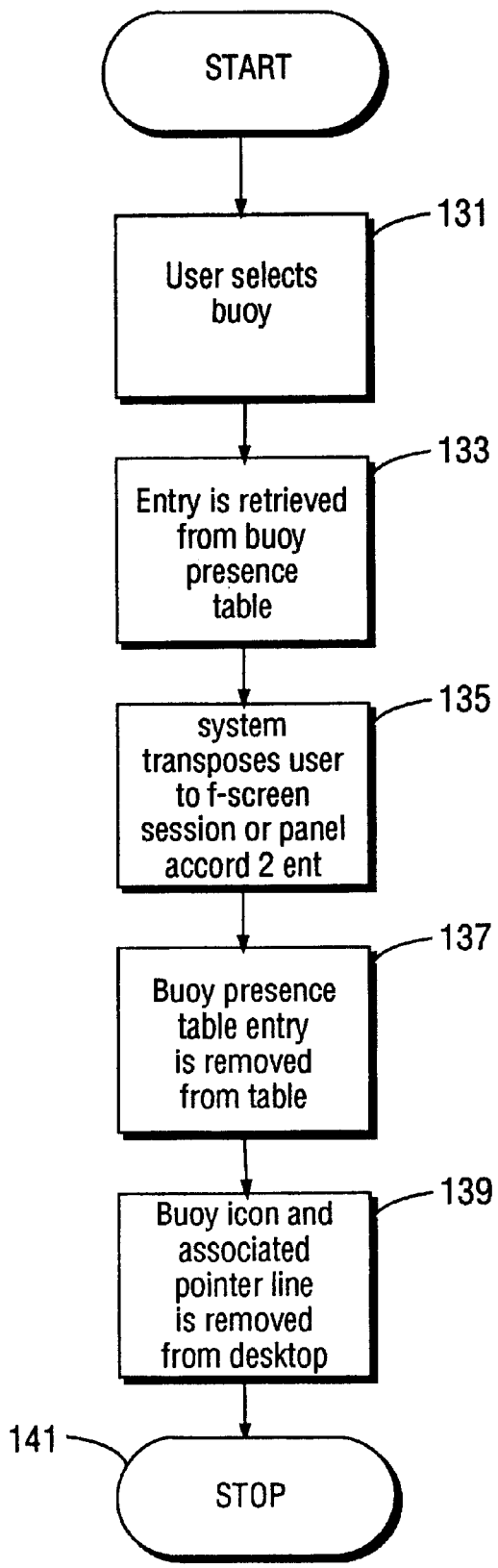

The method illustrated by the flow chart of FIG. 10 allows a user to focus the object specified by the buoy icon. The method of FIG. 10 utilizes the Buoy Presence Table of FIG. 14.

Figure 11:
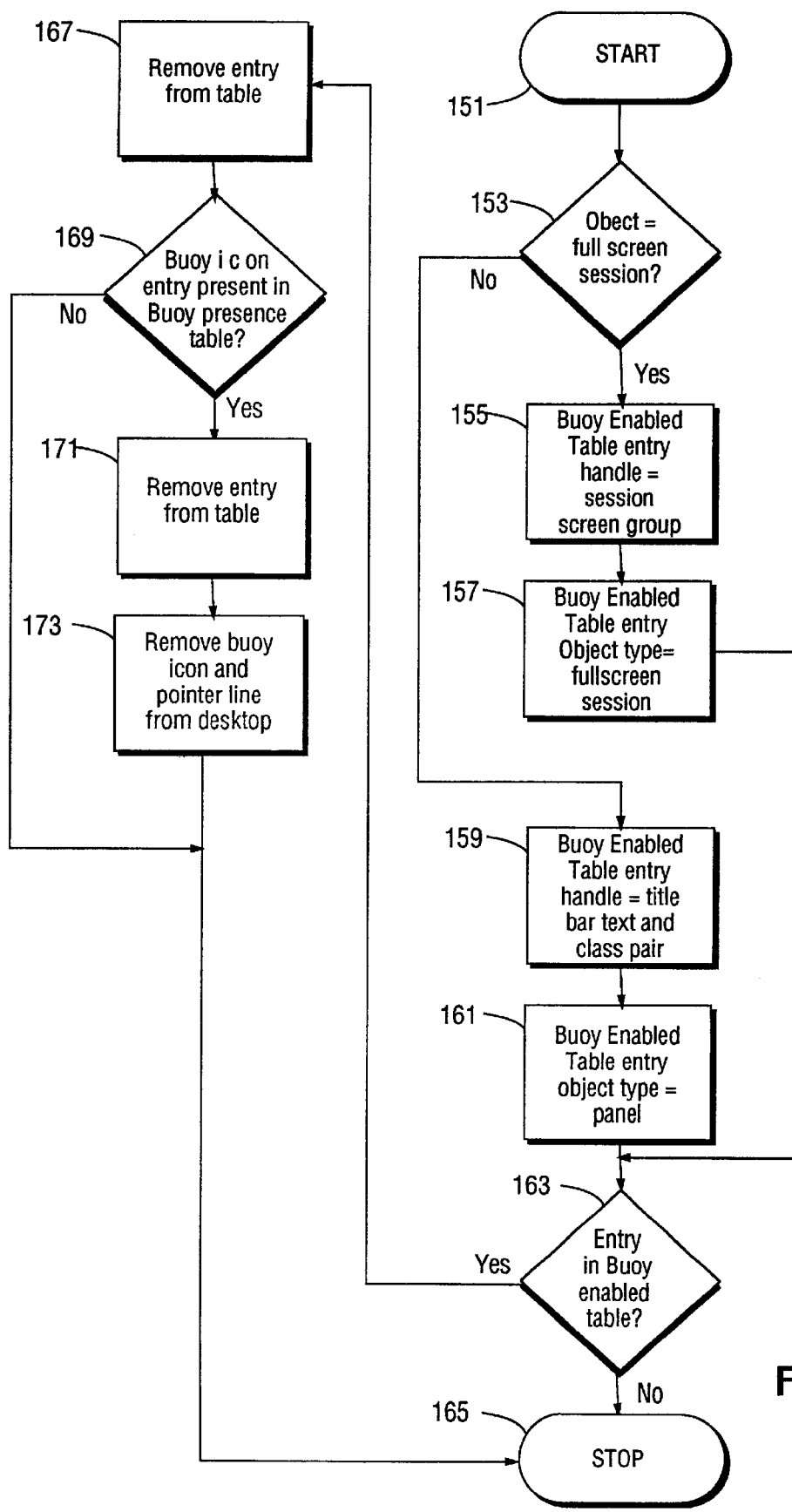

The method illustrated by the flow chart of FIG. 11 allows a user to disable the buoy icon notification for an object.

Referring now to FIG. 6, the method for enabling the buoy icon notification for an object will be discussed. The user focuses the object of interest, wherein the object is brought into focus. For example, referring to FIG. 2, the user focuses the phone icon 31 using the mouse cursor, keyboard or other input device. The object may be focused either as a window or as a full screen session. Once the object is focused, then the user executes the method of FIG. 6, starting at step 51. The method is executed, for example, with a keyboard invocation sequence, a voice command, a pull down menu on the object window, etc. After step 51, the method provides an entry $F_i$ 70 for the object in the Buoy Enabled Table of FIG. 13. Each entry $F_i$ 70 of the Buoy Enabled Table has two parameters or fields, namely a handle 68 and an object type 69. The values of the two parameters depend on whether the object is a full screen session or a window. Therefore, in step 53 of FIG. 6, the method determines if the object is a full screen session. This is determined from the title bar text and class (or some other unique attribute) of the object. If the result of step 53 is YES, then in step 55, the Buoy Enabled Table entry handle 68 is set to the reference of the screen session group associated with the object. The screen session group is a set of resources (such as peripherals) attached to a session and is a unique reference for identifying the particular full screen session. In step 57, the Buoy Enabled Table object type 69 is set to full screen session. The object type may be a constant which is representative of a full screen session. After step 57, the method proceeds to step 63.

If the result of step 53 is NO, then the object has a window (or panel) for a user interface, and the method proceeds to step 59. In step 59, the Buoy Enabled Table entry handle 68 is set to the title bar text and classification pair of the window. The title bar text and classification as a pair is a unique identifier of the particular object window. Various embodiments may utilize other unique identifying information as appropriate to the computer system. In step 61, the Buoy Enabled Table entry object type 69 is set to panel (or window). The object type may be a constant that is different from the full screen session constant. After step 61, the method proceeds to step 63.

Figure 13:
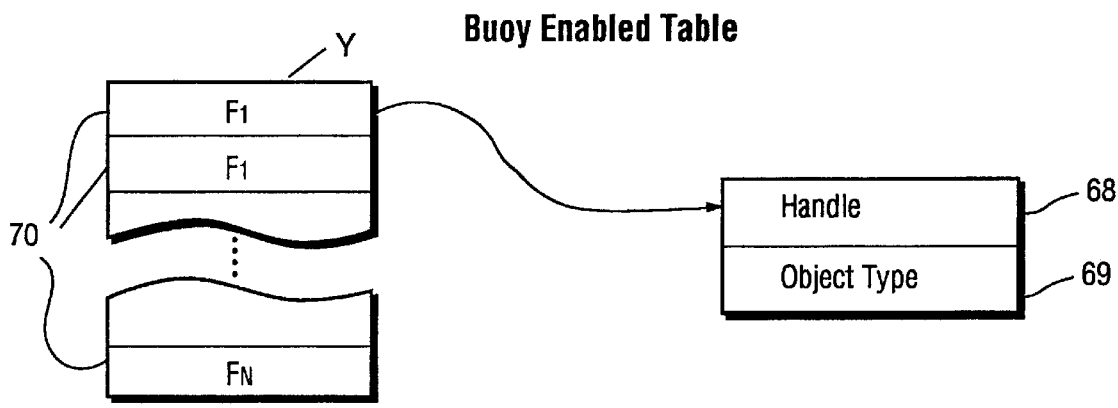

In step 63, the method determines if the entry is already in the Buoy Enabled Table of FIG. 13. If the result of step 63 is NO, then in step 65, the entry is placed into the Buoy Enabled Table. The method then stops, step 67. If the result of step 63 is YES, then step 65 is bypassed, and the method proceeds directly to step 67 to stop. Thus, the presence of an entry in the Buoy Enabled Table (FIG. 13) implies the user requested buoy icon notification.

Referring now to FIG. 7, the method for registering an executing object will be discussed. Information on an executing object is placed in the Active Thread Table of FIG. 12. The Active Thread Table provides a correlation between buoy icon notification information and executing object information. The method of FIG. 7 is executed when an object is executed, step 71. The object is executed when a thread (which is a flow of execution in a multitasking computer) of the object executes as a result of a user input in the user interface for the object. For example, the user could press the ENTER key to cause the object to execute. After step 71, the method provides an entry $E_i$ 72 for the object in the Active Thread Table of FIG. 12. Each entry $E_i$ 72 of the Active Thread Table has the following parameters or fields: a handle 68, an object type 69, a process identification 87 (PID) and a thread identification 89 (TID). The values for the handle and the object type depend on whether the object is a full screen session or a window as heretofore described. Therefore, in step 73 of FIG. 7, the method determines if the object is a full screen session. If the result of step 73 is YES, then the method proceeds to step 75. In step 75, the Active Thread Table entry handle 68 is set to the session screen group associated with the object, much like in step 55 of FIG. 6. Thereafter, in step 77, the Active Thread Table entry object type 69 is set to full screen session, much like in step 57 of FIG. 6. After step 77, the method proceeds to step 83.

If the result of step 73 is NO, then the object being executed has a window for a user interface, and the method proceeds to step 79. In step 79, the active Thread Table entry handle 68 is set to the title bar text and classification pair, like in step 59 of FIG. 6. Thereafter, in step 81, the Active Thread Table entry object type 69 is set to panel, like in step 61 of FIG. 6. After step 81, the method proceeds to step 83.

In step 83, the method sets the PID field 87 and TID field 89 of the Active Thread Entry. The PID and the TID are unique handles assigned to an object during the execution of the object by the computer operating system. The PID and the TID are obtained from the operating system. Thereafter, in step 85, the method stops.

Referring now to FIG. 8, the method of displaying the buoy icon will be discussed. The method of FIG. 8 executes whenever a thread in the computer system becomes idle or blocked, step 91. In one type of operating system (namely OS/2), a thread is blocked when it is no longer able to execute. A blocked thread is thus idle. A common example of a thread becoming idle occurs whenever a thread execution ends. The execution of the thread stops until a user input is provided. Thereafter, in step 93, the method determines if the idled thread has an entry in the Active Thread Table of FIG. 12. This is done by comparing the PID and TID of the idled thread with the PID 87 and TID 89 of each entry $E_i$ 72 in the Active Thread Table. If no match is found, then the result of step 93 is NO, and the method proceeds to step 109 to stop. If a match is found, then the result of step 93 is YES, and the method proceeds to step 95. In step 95, the entry for the idled object is stored in memory and then removed from the Active Thread Table of FIG. 12.

Thereafter, in step 97, the method determines if an entry $F_i$ 70 for the idled object is in the Buoy Enabled Table of FIG. 13. This is done by comparing the handle 68 obtained from the Active Thread Table of FIG. 12 to the entry handles of the Buoy Enabled Table. If the result of step 97 is NO, then it is determined that buoy icon notification for that object has not been enabled, and the method stops, step 109. If the result of step 97 is YES, then it is determined that buoy icon notification for that object has been enabled, and the method proceeds to step 99. In step 99, the method determines if the idled object is a full screen session. This is determined from the object type 69 found in the Buoy Enabled Table entry $F_i$ 70. If the object is a full screen session, then the result of step 99 is YES, and the method proceeds to step 101.

In step 101, the method determines if the full screen session of the idled object is in focus on the screen. This is determined by a call to the presentation manager of the operating system. The presentation manager returns the handle of the object that is in focus. If the result of step 101 is YES, then the object full screen session is already focused, and there is no need to provide a buoy icon notification. This is because any prompt by the object for user input will be displayed on the screen, wherein the user can view the prompt. Thus, if the result of step 101 is YES, the method stops, step 109.

If the result of step 101 is NO, then in step 103, the buoy icon is drawn or displayed appropriately on the full screen session. The buoy icon 35 is drawn as shown in FIG. 2 and can include the name of the object and a "mooring" line 45 connecting the buoy icon to the icon 31 of the object. In addition, the buoy icon is appropriately drawn so as not to interfere with the currently focused object 33. Thus, the buoy icon is typically located around the edges of the screen or outside of the focused window.

Figure 14:
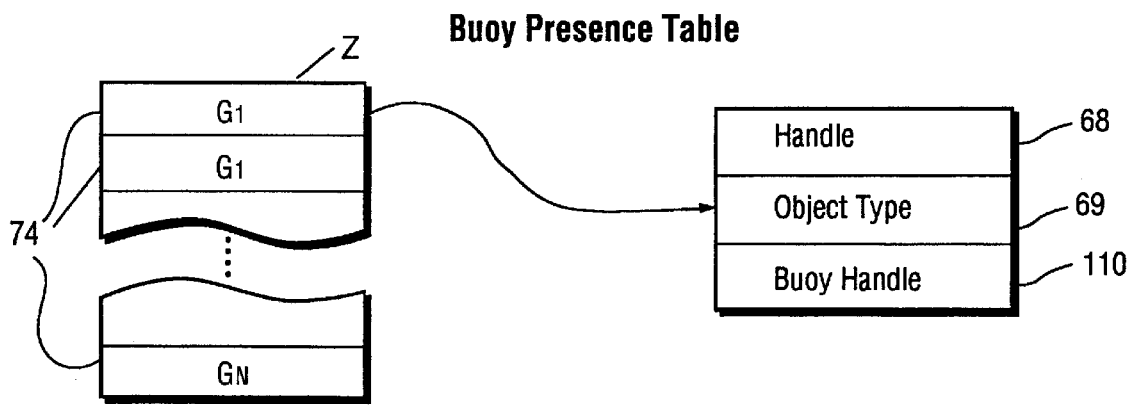

Thereafter, in step 105, an entry corresponding to the newly presented object is placed into the Buoy Presence Table Z (see FIG. 14). The Buoy Presence Table Z maintains information on all buoys that are displayed on the screen 17. This information is useful when using a buoy icon to focus an object. Each entry $G_i$ 74 of the Buoy Presence Table Z has the following parameters or fields: the handle 68 of the object, the object type 69 and a buoy handle 110. The buoy handle 110 is an identifier for the particular buoy icon which is uniquely associated to the corresponding buoy icon.

Thus, the buoy icon becomes an object in and of itself. The buoy handle 110 contains enough information to properly identify the respective buoy.

Thereafter, in step 107 of FIG. 8, a pointer or mooring line 45 (see FIG. 2) is drawn on the screen 17 connecting the buoy icon 35 to the associated object icon 31. The line is non-priority, wherein the line will not be drawn over a focused object. After step 107, the method stops, step 109. Various embodiments may or may not draw the line or some other visual indicator that connects the buoy icon to the associated object icon.

Returning to step 99, if the idled object is a window or panel instead of a full screen session, then the result of step 99 is NO, and the method proceeds to step 111. In step 111, the method determines if the idle panel object is in focus. If the result of step 111 is YES, then the method stops, step 109, for the same reason as a YES result in step 101. If the result of step 111 is NO, then the method proceeds to steps 103 et seq., wherein a buoy icon 35 and a connecting line 35 are drawn on the screen 17.

Once the buoy icon is displayed on the screen, the user can either remove the icon, select the icon or ignore the icon. Referring to FIG. 9, the method for removing the icon will be discussed. The user positions a cursor over the desired buoy icon, step 121, or otherwise targets the buoy icon. The user may utilize a mouse cursor, a keyboard cursor or some other input cursor. Thereafter, in step 123, the user enters a remove sequence with an input device. For example, with a mouse, the user could press the right mouse button. With a keyboard, the user could press an escape key or function key. Thereafter, in step 125, the buoy icon, any name and the pointer line are removed or deleted from the desktop on the screen. In step 127, the Buoy Presence Table entry $G_i$ 74 (see FIG. 14) corresponding to the removed buoy icon is removed from the Buoy Presence Table Z. After step 127, the method stops, step 129.

Referring to FIG. 10, the method for selecting a buoy icon and providing focus to its associated object will now be described. In step 131, the user selects the desired buoy icon. Selection can be, for example, by placing a mouse cursor on the buoy icon, and then double clicking a left mouse button. Thereafter, in step 133, the entry $G_i$ 74 (see FIG. 14) associated with the selected buoy icon is retrieved from the Buoy Presence Table Z. Thereafter, in step 135, the computer system focuses the object on the screen using the handle 68 to determine the specific object. The object type 69 is obtained from the Buoy Presence Table entry 74. If the object is a window, then the window is displayed in the foreground on the screen (as a focused window). If the object is a full screen session, then the appropriate session is transposed to and the entire screen which is taken up by the session. Thereafter, in step 137, the Buoy Presence Table entry $G_i$ 74 for the selected buoy icon is removed from the Buoy Presence Table Z. Thereafter, in step 139, the buoy icon 35 and the associated pointer line 45 are removed from the desktop 25 and the screen 17. Steps 135, 137 and 139 can be performed in any order. Thereafter, the method stops in step 141. An alternative embodiment may keep the buoy present, thereby forcing the user to use the method of FIG. 9 to remove it.

The method of FIG. 11 will now be described. The method of FIG. 11 allows a user to disable buoy icon notification for a particular object. The user focuses the particular object of interest. The user then executes the method of FIG. 11, step 151. This can be accomplished, with a variety of user invocation methods. Thereafter, in step 153, the method determines if the object is a full screen session. If the result of step 153 is YES, then in steps 155 and 157, the handle 68 (see FIG. 13) is set to the session screen group and the object type 69 is set to full screen session for a Buoy Enabled Table entry $F_i$ 70, like in steps 55 and 57 of FIG. 6. After step 157, the method proceeds to step 163.

Returning to step 153, f the object is a window, then the result of step 153 is NO, and the method proceeds to steps 159 and 161. In steps 159 and 161, the handle 68 (see FIG. 13) is set to the title bar text and classification pair of the object, and the object type 69 is set to window for the Buoy Enabled Table entry $F_i$ 70, like in steps 59 and 61 of FIG. 6. After step 161, the method proceeds to step 163.

In step 163, the method determines if an entry describing the focused object is in the Buoy Enabled Table Y of FIG. 13. If the result of step 163 is NO, then the method stops, step 165. If the result of step 163 is YES, then the entry $F_i$ 70 is removed from the Buoy Enabled Table Y, step 167.

Thereafter, in step 169, the method determines if there is a buoy icon entry $G_i$ 74 present in the Buoy Presence Table Y of FIG. 14. If the result of step 169 is NO, then the method stops, step 165. However, if the result of step 169 is YES, then the entry $G_i$ 74 is removed from the Buoy Presence Table Z, step 171. Thereafter, in step 173, the buoy icon 35 and pointer line 45 are removed from the desktop 25. The method then stops, step 165. Thus, if the user disables the buoy icon notification for an object while the buoy icon is displayed for that object, then the buoy icon will disappear from view on the desktop.

Although the present invention has been described as allowing a user to enable and disable buoy icon notification on an object-by-object basis, the present invention could also provide that the buoy icon notification is enabled by the system for all objects, or for a selected set of objects, wherein the need for a Buoy Enabled Table would be eliminated.

Although the present invention has been described as providing a buoy icon without interfering with the currently focused object, the buoy icon could be displayed with input focus. Thus, when the buoy icon is displayed, the buoy icon is focused. The object that was focused before the buoy icon was displayed is relegated to background status. Further user inputs would be provided to the buoy icon and not to the previously focused object.

Although the present invention has been described as displaying a buoy icon for notification, other designs could be displayed or provided for notification purposes.

The foregoing disclosure and the showings made in the drawings are merely illustrative of the principles of this invention and are not to be interpreted in a limiting sense.

What we claim is:

1. A method that is implemented on a multitasking computer that comprises first and second objects, said method providing notification of a status of said first object on said computer, comprising the steps of:

a) providing a representation of said first object on a user interface of said computer, with the representation supporting user interaction with said first object on said user interface of said computer;

b) executing said first object on said computer;

c) while said first object is executing, enabling said second object so as to support user interaction with said second object on said user interface of said computer;

d) while said second object is enabled so as to support user interaction, determining when said first object ceases executing;

e) providing a notification on said user interface when said first object ceases executing by suddenly displaying a notification icon on said user interface of said computer while maintaining the representation of the first object, said notification icon being in a location that is separate from the representation of said first object on said user interface.

2. The method of claim 1 wherein said step of determining when said first object ceases executing further comprises the step of determining when said first object provides a prompt for a user input.

3. The method of claim 1 wherein said step of displaying a notification icon on a user interface further comprises the step of displaying a buoy shaped icon on a screen.

4. The method of claim 1 wherein said step of providing a notification on said user interface when said first object ceases executing further comprises the step of displaying a name of said first object in proximity to said notification icon.

5. The method of claim 1 wherein said step of providing a notification on said user interface when said first object ceases executing further comprises the step of displaying a line between said notification icon and said first object on said screen.

6. The method of claim 1 wherein said computer contains plural objects which comprise said first object and said second object, said method further comprising the step of enabling said notification for selected ones of said objects.

7. The method of claim 1 wherein said computer contains plural objects which comprise said first object and said second object, said method furtherer comprising the step of disabling said notification for selected ones of said objects.

8. The method of claim 1 further comprising the step of removing said notification icon from said user interface.

9. The method of claim 1 further comprising the steps of:

a) selecting said notification icon; and b) based upon said selecting of said notification icon, focusing said first object on said user interface, said step of focusing said first object on said user interface further comprising the step of enabling said first object for receiving a user input.

10. The method of claim 1 wherein said computer comprises a third object and said notification icon is a first notification icon, further comprising the steps of:

a) executing said third object;

b) determining when said third object ceases executing;

c) displaying on said user interface a second notification icon when said third object ceases executing, said second notification icon being separate from said third object; and d) removing said second notification icon from said user interface while maintaining said first notification icon on said user interface.

11. The method of claim 1 wherein said computer comprises a third object and said notification is a first notification, further comprising the steps of:

a) executing said third object;

b) determining when said third object ceases executing;

c) displaying on said user interface a second notification icon when said third object ceases executing, said second notification icon being separate from said third object;

d) selecting said second notification icon; and e) based upon said selecting of said second notification icon, focusing said third object on said user interface while maintaining said first notification icon said user interface.

12. An apparatus for use with a multitasking computer, said computer comprising first and second objects, said apparatus providing notification of a status of said first object on said computer, comprising:

a) means for providing a representation of said first object on a user interface of said computer, with the representation supporting user interaction with said first object on said user interface of said computer;

b) means for executing said first object on said computer;

c) means for enabling said second object so as to support user interaction with said second object on a user interface of said computer while said first object is executing;

d) means for determining when said first object ceases executing while said second object is enabled so as to support user interaction;

e) means for providing a notification on said user interface when said first object ceases executing by suddenly displaying a notification icon on said user interface of said computer while maintaining the representation of the first object, said notification icon being in a location that is separate from the representation of said first object on said user interface.

13. The apparatus of claim 12 wherein said means for determining when said first object ceases executing further comprises means for determining when said first object provides a prompt for a user input.

14. The apparatus of claim 12 wherein said means for providing a notification on said user interface when said first object ceases executing by displaying a notification icon further comprises means for displaying a buoy shaped icon on said screen.

15. The apparatus of claim 12 wherein said means for providing a notification on said user interface when said first object ceases executing further comprises means for displaying a name of said first object in proximity to said notification icon.

16. The apparatus of claim 12 wherein said means for providing a notification on said user interface when said first object ceases executing further comprises means for displaying a line between said notification icon and said first object on said screen.

17. The apparatus of claim 12 wherein said computer contains plural objects which comprise said first object and said second object, said apparatus further comprising means for enabling said notification for selected ones of said objects.

18. The apparatus of claim 12 wherein said computer contains plural objects which comprise said first object and said second object, said apparatus further comprising means for disabling said notification for selected ones of said objects.

19. The apparatus of claim 12 further comprising means for removing said notification icon from said user interface.

20. The apparatus of claim 12 further comprising:

a) means for selecting said notification icon; and b) means for focusing said first object on said user interface based upon said selecting of said notification icon, said means for focusing said first object on said user interface further comprising means for enabling said first object for receiving a user input.

21. The apparatus of claim 12 wherein said computer comprises a third object and said notification icon is a first notification icon, further comprising:

a) means for executing said third object;

b) means for determining when said third object ceases executing;

c) means for displaying on said user interface a second notification icon when said third object ceases executing, said second notification icon being separate from said third object; and d) means for removing said second notification icon from said user interface while maintaining said first notification icon said user interface.

22. The apparatus of claim 12 wherein said computer comprises a third object and said notification icon is a first notification icon, further comprising:

a) means for executing said third object;

b) means for determining when said third object ceases executing;

c) means for displaying on said user interface a second notification icon when said third object ceases executing, said second notification icon being separate from said third object;

d) means for selecting said second notification icon; and e) means for focusing said third object on said user interface while maintaining said first notification icon on said user interface based upon said selecting of said second notification icon.

23. The method of claim 9 wherein said step of enabling said second object further comprises the step of displaying said second object on a computer screen so that said second object occupies all of said screen.

24. The apparatus of claim 20 wherein said means for enabling said second object further comprises means for displaying said second object on a computer screen so that said second object occupies all of said screen.

25. The method of claim 1 wherein the step of suddenly displaying a notification icon on a user interface further comprises the step of causing said displayed notification icon to pulse.

* * * * *